United States Patent [19]

Brossier et al.

[11] Patent Number: 5,284,014
[45] Date of Patent: Feb. 8, 1994

[54] TURBOJET-RAMJET HYPERSONIC AIRCRAFT ENGINE

[75] Inventors: Pascal N. Brossier, Lieusaint; Georges Mazeaud, Yerres; Pascal C. Wurniesky, Savigny le Temple, all of France

[73] Assignee: Societe Nationale d'Etude et de Construction de Moteurs d'Aviation ("S.N.E.C.M.A."), Paris, France

[21] Appl. No.: 961,319

[22] Filed: Oct. 15, 1992

[30] Foreign Application Priority Data

Oct. 16, 1991 [FR] France .................. 91 12732

[51] Int. Cl.$^5$ ............................. F02K 9/00
[52] U.S. Cl. ........................ 60/225; 60/263; 60/270.1
[58] Field of Search ........... 60/225, 270.1, 244, 60/263, 39.33, 224, 271

[56] References Cited

U.S. PATENT DOCUMENTS

| | | |
|---|---|---|
| 2,696,078 | 12/1954 | Waitzman .............. 60/244 |
| 2,933,886 | 4/1960 | Sharma . |
| 2,934,894 | 5/1960 | Gregory et al. . |
| 3,540,221 | 11/1970 | Bouiller et al. ......... 60/244 |
| 4,050,243 | 9/1977 | Holzmann ............. 60/270.1 |
| 4,651,523 | 3/1987 | Adams ................. 60/270.1 |
| 4,909,031 | 3/1990 | Grieb .................. 60/225 |
| 5,058,377 | 10/1991 | Wildner ............... 60/225 |

FOREIGN PATENT DOCUMENTS

| | | |
|---|---|---|
| 3803876 | 9/1988 | Fed. Rep. of Germany . |
| 2389772 | 12/1978 | France . |
| 2605679 | 4/1988 | France . |
| 2656657 | 7/1991 | France . |
| 737081 | 9/1955 | United Kingdom . |
| 875496 | 8/1961 | United Kingdom ...... 60/224 |

OTHER PUBLICATIONS

41st Congress of the International Astronautical Federation—Oct. 6-12, 1990/Dresden, GDR IAF-90-256 *Turbojet-Type Engines for the Airbreathing Propulsion of Resuable Winged Launchers.*

Primary Examiner—Richard A. Bertsch
Assistant Examiner—Timothy S. Thorpe
Attorney, Agent, or Firm—Bacon & Thomas

[57] ABSTRACT

A combination turbojet-ramjet engine for powering a hypersonic aircraft is disclosed wherein the intake duct for the ramjet portion of the engine is centrally located within the turbojet portion of the engine in order to improve the access from outside the engine to the turbojet engine portion, as well as to maximize the use of common components and to simplify the control systems for changing from turbojet operation to ramjet operation and vice versa. The ramjet intake duct extends generally parallel to the longitudinal axis of the hypersonic aircraft engine and is located radially inwardly of the compressor, the combustion chamber and the turbine wheel of the turbojet engine portion. Flow control devices are located on the turbojet engine air intake, as well as the ramjet intake duct to control the supply of air to the respective engine portions.

12 Claims, 1 Drawing Sheet

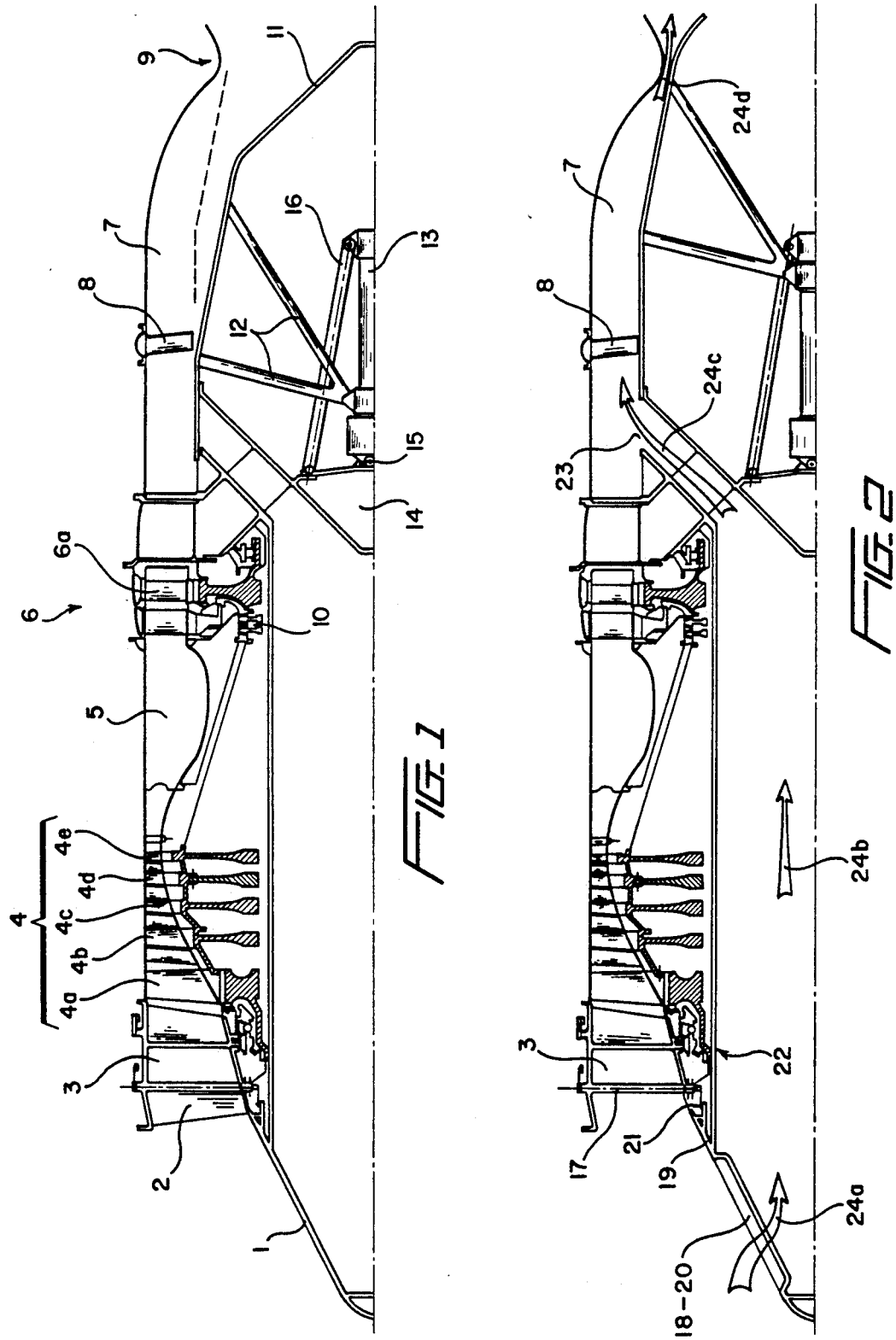

TURBOJET-RAMJET HYPERSONIC AIRCRAFT ENGINE

BACKGROUND OF THE INVENTION

The present invention relates to a hypersonic aircraft engine, more particularly such an engine capable of being operated in either a turbojet or a ramjet mode.

It is known in the art to use air-breathing turbojet engines to power aircraft to speeds approaching Mach 4 and to use ramjets to power the aircraft up to speed of Mach 7 or 8. It is also generally known to combine these engines into a single power plant to power hypersonic aircraft.

Such combined power plants have typically utilized a central air inlet duct to supply air to the turbojet engine and have utilized an annular duct enclosing the turbojet engine and/or the turbojet engine inlet duct in order to supply air to the ramjet portion of the power plant. Such designs are disclosed in U.S. Pat. Nos. 3,540,221 and 4,909,031, and have been discussed in Publication No. IAF-90-256 of the 41st Congress of the International Astronautical Federation in Dresden, Germany on Oct. 6–12, 1990.

While such power plants have proven theoretically feasible, they have suffered practical drawbacks due to their inherent complexity and the difficulties in accessing the turbojet engine for repair and/or maintenance.

SUMMARY OF THE INVENTION

A combination turbojet-ramjet engine for powering a hypersonic aircraft is disclosed wherein the intake duct for the ramjet portion of the engine is centrally located within the turbojet portion of the engine in order to improve the access from outside the engine to the turbojet engine portion, as well as to maximize the use of common components and to simplify the control systems for changing from turbojet operation to ramjet operation and vice versa.

The ramjet intake duct extends generally parallel to the longitudinal axis of the hypersonic aircraft engine and is located radially inwardly of the compressor, the combustion chamber and the turbine wheel of the turbojet engine portion. Flow control devices are located on the turbojet engine air intake, as well as the ramjet intake duct to control the supply of air to the respective engine portions. When the flow control device for the turbojet engine portion is open, thereby allowing air to enter the turbojet engine portion, the flow control device for the ramjet intake duct is closed, and vice versa. The flow control devices are interconnected in order to simplify the controls involved in switching between turbojet and ramjet modes of operation.

The turbojet-ramjet engine according to this invention also has a variable geometry nozzle with a nozzle cone movable between first and second positions, depending upon the mode of operation. When the engine is operated in the turbojet mode, the movable nozzle cone closes off a passage communicating the ramjet intake duct with the nozzle, thereby preventing operation of the engine in the ramjet mode. When it is desired to operate the engine in the ramjet mode, the nozzle cone is moved to its second position in which it not only varies the geometry of the exhaust nozzle, but also opens the passage communicating the ramjet intake duct with a heating duct in which ramjet combustion takes place.

The airflow control device for the turbojet engine may consist of a plurality of radially disposed, pivoting vanes which may be moved about their pivot axes to selectively open or close the turbojet engine air intake. To control the flow of air into the ramjet intake duct, an inlet cone and an intake collar are utilized. Both the cone and the collar define a series of circumferentially displaced openings and the intake collar is movable relative to the intake cone. When the engine is operated in the turbojet engine mode, the cone and collar are positioned such that their respective openings are out of alignment, thereby preventing entry of air into the ramjet intake duct. When the engine is operated in the ramjet mode, the cone and collar are positioned such that their openings are aligned in order to supply air to the ramjet portion of the engine.

BRIEF DESCRIPTION OF THE DRAWINGS

FIG. 1 is a diagrammatic, partial, longitudinal cross-section of the combination turbojet-ramjet engine according to the present invention when operated in the turbojet engine mode.

FIG. 2 is a view similar to FIG. 1, but illustrating the positions of the respective components when the engine is operated in the ramjet mode.

DETAILED DESCRIPTION OF THE PREFERRED EMBODIMENT

The combination turbojet-ramjet hypersonic aircraft engine according to the present invention is illustrated in the turbojet operating mode in FIG. 1. As can be seen, the turbojet engine comprises, from front to rear or from upstream to downstream in the ordinary flow direction of the propelling fluids, a central intake cone 1, a plurality of variable intake flaps 2 extending in generally a radial direction around the intake cone 1, an intake case 3 comprising a plurality of radial structural arms, an axial compressor 4 having a plurality of stages, in this particular instance five stages 4a–4e, an annular combustion chamber 5 which is supplied, in known manner, with a fuel, such as hydrogen, a turbine 6 driven by gases emanating from the combustion chamber 5 and, in this particular instance, comprising a single stage of moving blades 6a, a heating duct 7 having, in known fashion, a hydrogen fuel supply system 8 and a variable cross section nozzle 9. In known fashion, these items extend around a central longitudinal axis.

The turbojet engine may also incorporate means to cool the turbine 6, as set forth in French patent 2,656,657. This device may comprise an auxiliary compressor 10 which recompresses cooling air taken from a stage of the air compressor and moves the air into the turbine 6.

The cross-sectional configuration of exhaust nozzle 9 is controlled by the longitudinal displacement of a central exhaust cone 11 which is also movable in a longitudinal direction generally parallel to the longitudinal axis of the engine. In the illustrated embodiment, the exhaust cone 11 is connected to rods 12 which, in turn, are moved by a jack device 13. Jack device 13, which may be a pneumatic jack, hydraulic jack, or other known means, is affixed to the inner engine structure 14 by a fastening means 15 which may include a link 16.

The engine is operated in the configuration shown in FIG. 1 in the turbojet mode and may be utilized to power an aircraft up to speeds of approximately Mach 4. When operating in this mode, the intake flaps 2 are moved to their open positions so as to generally coincide with the position of radial arms 3 to direct air into the turbojet engine. The exhaust cone 11 is moved to its first, or upstream position relative to the exhaust nozzle 9.

Beyond aircraft speeds of approximately Mach 4, it is necessary to operate the engine in the ramjet mode. The positions of the components for operating the engine in this mode are illustrated in FIG. 2. As can be seen, the turbojet intake flaps 2 are movable about pivoting shafts 17 and are rotated by known means such as jacks or other actuators, to their closed positions in which they prevent airflow from entering into the turbojet portion of the engine. An intake collar 19 located on the intake cone 1 defines a plurality of generally radially extending, circumferentially displaced openings 20, while intake cone 1 also defines a plurality of generally radially extending, circumferentially displaced openings 18. When operating in the turbojet engine mode, the relative positions of the intake cone and the intake collar are such that the respective openings 18 and 20 are out of alignment with each other so as to prevent air from entering into the ramjet portion of the engine.

As intake collar 19 is rotated by its connection to the pivoting flap shafts 17, the openings 18 and 20 are brought into alignment with each other, thereby allowing air to enter the ramjet intake duct 22. Shafts 17 are connected to the movable intake collar 19 by a system of link rods 21. Thus, by interconnecting the respective flow control devices, the engine can be efficiently switched between the turbojet and ramjet operating modes with a minimum complexity control mechanism. Rotation of the shafts 17 in a direction which closes the flaps 2 also rotates collar 19 so as to align its openings 20 with the openings 18 in the intake cone 1. As can be seen, the ramjet intake duct 22 extends generally parallel to the longitudinal axis of the engine and is located radially inwardly of the turbojet engine components, such as the air compressor, the combustion chamber and the turbine.

When the engine is operated in the ramjet mode, the exhaust cone 11 is moved to its second, or rearwardmost position, as illustrated in FIG. 2, by jack 13. When moved to this position, the exhaust nozzle cone 11 uncovers annular passage 23 which interconnects the ramjet intake duct 22 to the heating duct 7. Such movement also varies the geometry of the nozzle 9 to facilitate operation in the ramjet mode.

As can be seen in FIG. 2, the gas flow through the engine when operating in the ramjet mode is denoted by arrows 24a-24d. Fuel, such as hydrogen, supplied through supply system 8, is burned in the heating duct 7 when the engine operates in the ramjet mode.

The combination turbojet-ramjet engine according to the present invention provides a common control system for controlling the flow of air to either the turbojet air intake or to the ramjet intake duct with minimum operational complexity. The engine also includes a variable geometry nozzle which also controls the flow of air into the ramjet combustion chamber.

By interconnecting the flow control devices for the turbojet air intake and the ramjet intake duct, air utilized during the ramjet operational mode, which may approach temperatures of nearly 2,100° K., is prevented from entering the turbojet portion of the engine to prevent damage thereto. The invention also allows a ramjet intake duct to have a relatively small diameter to increase the supply pressure, thereby saving weight and complexity over the known prior art devices.

The foregoing description is provided for illustrative purposes only and should not be construed as in any way limiting this invention, the scope of which is defined solely by the appended claims.

I claim:

1. A combination turbojet-ramjet hypersonic aircraft engine having a longitudinal axis, comprising:
    a) a turbojet engine portion having an air intake, air compressor means communicating with the air intake, combustion chamber means communicating with the air compressor means, and a turbine wheel driven by gases emanating from the combustion chamber means;
    b) a ramjet intake duct having an upstream end and extending generally parallel to the longitudinal axis, the duct located inwardly of the air compressor means, the combustion chamber means and the turbine wheel in a direction toward the longitudinal axis;
    c) first flow control means operatively associated with the turbojet engine air intake to selectively open and close the air intake;
    d) second flow control means operatively associated with the upstream end of the ramjet intake duct to selectively open and close the ramjet intake duct; and,
    e) actuating means operatively interconnecting the first and second flow control means such that, when the first flow control means opens the turbojet engine air intake the second flow control means closes the ramjet intake duct and vice versa.

2. The combination turbojet-ramjet engine of claim 1 wherein the first flow control means comprises a plurality of flaps pivotally located adjacent to the turbojet engine air intake so as to be movable between open positions wherein air is permitted to enter the air intake, and closed positions wherein air is prevented from entering the air intake.

3. The combination turbojet-ramjet engine of claim 1 wherein the second flow control means comprises:
    a) an intake cone located on the upstream end of the ramjet intake duct and defining a plurality of first circumferentially displaced openings; and,
    b) an intake collar located adjacent to the intake cone such that the intake collar is rotatable with respect to the intake cone, the intake collar defining a plurality of second circumferentially displaced openings wherein the
    actuating means rotates the intake collar relative to the intake cone between a first position wherein the first and second openings are circumferentially displaced from each other thereby preventing air from entering the ramjet intake duct, and a second position wherein the first and second openings are aligned so as to allow air to pass into the ramjet intake duct.

4. The combination turbojet-ramjet engine of claim 3 wherein the first flow control means comprises a plurality of flaps pivotally located adjacent to the turbojet engine air intake so as to be movable between open positions wherein air is permitted to enter the air intake, and closed positions wherein air is prevented from entering the air intake.

5. The combination turbojet-ramjet engine of claim 1 further comprising:
    a) a heating duct operatively associated with the turbojet engine;

b) passage means interconnecting the ramjet intake duct and the heating duct; and, c) a variable nozzle assembly operatively associated with the heating duct and comprising a nozzle cone movable between a first position when the engine is operating in the turbojet mode, in which first position the nozzle cone closes the passage means interconnecting the ramjet intake duct and the heating duct, and a second position when the engine is operating in the ramjet mode wherein the passage means interconnecting the ramjet intake duct and the heating duct is opened.

6. The combination turbojet-ramjet of claim 5 wherein the passage means is generally annular in configuration.

7. A combination turbojet-ramjet hypersonic aircraft engine having a longitudinal axis, comprising:

a) a turbojet engine portion having an air intake, air compressor means communicating with the air intake, combustion chamber means communicating with the air compressor means, and a turbine wheel driven by gases emanating from the combustion chamber means;

b) a ramjet intake duct having an upstream end and extending generally parallel to the longitudinal axis, the duct located inwardly of the air compressor means, the combustion chamber means and the turbine wheel in a direction toward the longitudinal axis;

c) first flow control means operatively associated with the turbojet engine air intake to selectively open and close the air intake;

d) second flow control means operatively associated with the upstream end of the ramjet intake duct to selectively open and close the ramjet intake duct;

e) a heating duct operatively associated with the turbojet engine;

f) passage means interconnecting the ramjet intake duct and the heating duct; and, g) a variable nozzle assembly operatively associated with the heating duct and comprising a nozzle cone movable between a first position when the engine is operating in the turbojet mode, in which first position the nozzle cone closes the passage means interconnecting the ramjet intake duct and the heating duct, and a second position when the engine is operating in the ramjet mode wherein the passage means interconnecting the ramjet intake duct and the heating duct is opened.

8. The combination turbojet-ramjet engine of claim 7 wherein the first flow control means comprises a plurality of flaps pivotally located adjacent to the turbojet engine air intake so as to be movable between open positions wherein air is permitted to enter the air intake, and closed positions wherein air is prevented from entering the air intake.

9. The combination turbojet-ramjet engine of claim 7 wherein the second flow control means comprises:

a) an intake cone located on the upstream end of the ramjet intake duct and defining a plurality of first circumferentially displaced openings;

b) an intake collar located adjacent to the intake cone such that the intake collar is rotatable with respect to the intake cone, the intake collar defining a plurality of second circumferentially displaced openings; and, c) actuating means to rotate the intake collar relative to the intake cone between a first position in which the first and second openings are circumferentially displaced from each other thereby preventing air from entering the ramjet intake duct, and a second position in which the first and second openings are aligned so as to allow air to pass into the ramjet intake duct.

10. The combination turbojet-ramjet engine of claim 9 wherein the first flow control means comprises a plurality of flaps pivotally located adjacent to the turbojet engine air intake so as to be movable between open positions wherein air is permitted to enter the air intake, and closed positions wherein air is prevented from entering the air intake.

11. The combination turbojet-ramjet engine of claim 10 further comprising means operatively connecting the actuating means and the plurality of flaps such that when the flaps are in their closed positions the intake collar is in its second position and when the flaps are in their open positions the intake collar is in its first position.

12. The combination turbojet-ramjet of claim 7 wherein the passage means is generally annular in configuration.

* * * * *